(12) United States Patent
Chun et al.

(10) Patent No.: US 7,664,131 B2
(45) Date of Patent: Feb. 16, 2010

(54) CHANNEL RESOURCE ASSIGNMENT METHOD FOR FAIR CHANNEL RESOURCE RESERVATION AND QOS IN MESH WPAN

(75) Inventors: Young-Ae Chun, Daejon (KR); Ji-Eun Kim, Daejon (KR); Sang-Jae Lee, Daejon (KR); Sang-Sung Choi, Daejon (KR); Kwang-Roh Park, Daejon (KR); Byung-Joo Lee, Seoul (KR); Seung-Hyong Rhee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 513 days.

(21) Appl. No.: 11/511,051

(22) Filed: Aug. 28, 2006

(65) Prior Publication Data

US 2007/0133590 A1 Jun. 14, 2007

(30) Foreign Application Priority Data

Dec. 9, 2005 (KR) ............... 10-2005-0121143

(51) Int. Cl.
*H04B 7/212* (2006.01)
(52) U.S. Cl. .................................... 370/443
(58) Field of Classification Search ................ 370/443, 370/337, 329, 336, 338, 349
See application file for complete search history.

(56) References Cited

U.S. PATENT DOCUMENTS 6,501,737 B1* 12/2002 Mathal et al. ............ 370/252
7,127,254 B2* 10/2006 Shvodian et al. ........... 455/450
7,417,997 B2* 8/2008 Bae et al. ................ 370/401
7,489,646 B2* 2/2009 Sung et al. ............... 370/280
2003/0152100 A1 8/2003 Gaedke et al.
2006/0092899 A1* 5/2006 Hong et al. ............... 370/338

FOREIGN PATENT DOCUMENTS

KR   10-2002-0056047   7/2002

OTHER PUBLICATIONS

Kuo, Y.L., "Noncooperative Admission Control for Differentiated Services in IEEE 802.11 WLANs." 2004. *IEEE Communications Society Globecom 2004*, 0-7803-8794-5/04.

* cited by examiner

*Primary Examiner*—Derrick W Ferris
*Assistant Examiner*—Mohammad Anwar
(74) *Attorney, Agent, or Firm*—Ladas & Parry LLP

(57) ABSTRACT

Provided is a channel resource assignment method for fair channel resource reservation in a mesh WPAN, in which the amount of channel resources is fairly reserved when devices share the channel resources. The channel resource assignment method in a mesh Wireless Personal Area Network (WPAN) includes the steps of: (a) transmitting beacons of all devices and adding an amount of channel resource to be reserved to the beacons so as to assign the channel resource for fair channel resource reservation between corresponding devices and adjacent devices when a mesh network is configured; (b) accumulating the amount of the channel resources reserved by all the adjacent devices except the corresponding device; and (c) determining the amount of the channel resources to be reserved.

5 Claims, 6 Drawing Sheets

CHANNEL RESOURCE ASSIGNMENT METHOD FOR FAIR CHANNEL RESOURCE RESERVATION AND QOS IN MESH WPAN

FIELD OF THE INVENTION

The present invention relates to a channel resource assignment method for fair channel resource reservation and quality of service (QoS) in a mesh Wireless Personal Area Network (WPAN); and, more particularly, to a channel resource assignment method for fair channel resource reservation and QoS in a mesh WPAN, capable of efficiently assigning channel resources by efficiently managing an amount of channel time that is reserved by devices when a mesh network such as IEEE 802.15.3 is configured.

DESCRIPTION OF RELATED ART

Institute of Electrical and Electronics Engineers (IEEE) 802.15.3 uses channel resources using a Time Division Multiple Access (TDMA) scheme. Devices belonging to a predetermined area configure a piconet and one of them acts as a coordinator. The coordinator synchronizes the devices of the piconet through beacons and manages the piconet. Also, the coordinator assigns channel resources to the devices.

Each of the devices requests the channel resource to the coordinator and the coordinator operates according to the request. In such an "IEEE 802.15.3 High-Rate WPAN," the centralized coordinator assigns the channel resources and manages the piconet.

TG5 of the IEEE 805.15 working group is under standardization for a mesh networking of the WPAN. Many proposals for TG5 have been submitted. To establish the mesh networking of the WPAN, Media Access Control (MAC) protocol has to be modified.

Among the proposals for the MAC protocol, the most specified approach was proposed in a Mesh PAN Alliance (MPA) and is the powerful MAC protocol of the mesh WPAN. This MAC protocol also uses the channel resources in the TDMA scheme.

Unlike the IEEE 802.15.3 in which the channel resource is controlled by the centralized coordinator, the respective devices reserve their necessary channel resources for themselves.

For this purpose, all the devices transmit their beacons in beacon period of a superframe structure, as shown in FIG. 1. The devices transmit the beacons using slots that are not used among a plurality of beacon slots within the beacon period. A beacon frame includes device ID, synchronization information, information of an adjacent device, information of a device spaced apart by 2 hops, and information on use of transmission media. Using a table that records information of the adjacent devices, the respective devices can know information on the used beacon slots and records the IDs and transmission power of the respective devices. A previously reserved transmission is done during a data transmit period (DTP). The previously reserved transmission uses a distributed reservation protocol (DRP). The channel resource reservation can prevent the competition and collision during the DTP. Also, if the channel resources are used in a distributed manner, the reuse of the channel resources is efficient in terms of space. Such a DRP uses reservation information transmitted by the beacon. A transmitter and a receiver reserve the DTP period through negotiation and notify the reserved contents through beacon frames.

In the reservation procedure, the confirmation of all reservations is achieved by the receiver. The respective reservations have priorities. The reservation having high priority has to be arranged at a location of the reservation having low priority. Also, all transmission is a one-way transmission that is achieved by the transmitter. The channel resource is assigned to the transmission device. Through this assignment, the transmission interference can be reduced.

Therefore, in the case where the channel resource is reserved in the MPA using the above-described method, a fairness problem occurs between other devices when a specific device reserves a large amount of channel resource and uses it. That is, the device that tries the reservation so as to use the channel resource in the future tries the reservation except the previously reserved part. In this case, the devices that newly access the piconet or try the channel resource reservation late can reserve a smaller amount of channel resource than the devices that have used the channel resources. Therefore, the use of the channel resources in the existing MPA becomes unfair between the device having reserved the channel resource and the device newly requesting the channel resource.

SUMMARY OF THE INVENTION

It is, therefore, an object of the present invention to provide a channel resource assignment method for fair channel resource reservation in a mesh WPAN, in which an amount of channel resource is fairly reserved when devices share the channel resources.

It is another object of the present invention to provide a channel resource assignment method for guaranteeing QoS in a mesh WPAN, in which QoS of a specific device is guaranteed when a predetermined amount of channel resource is required.

In accordance with an aspect of the present invention, there is provided a channel resource assignment method in a mesh Wireless Personal Area Network (WPAN), including the steps of: (a) transmitting beacons of all devices and adding an amount of channel resource to be reserved to the beacons so as to assign the channel resource for fair channel resource reservation between corresponding devices and adjacent devices when a mesh network is configured; (b) accumulating the amount of the channel resources reserved by all the adjacent devices except the corresponding device; and (c) determining the amount of the channel resources to be reserved by the corresponding devices using the following equations $$T_{others} = \sum_{j \neq i} T_j$$

$$T_i = \alpha(C - T_{others})$$

where C represents a maximum size of a data transmit period (DTP) and is a sum of the DTP for reservation and a contention access period (CAP), and a is a rate factor.

The contents related to the channel resources are transmitted within the beacon frame, and the amount of channel resource is fairly reserved so that devices can fairly reserve the channel resources. Also, when a new device tries the channel resource reservation, it can fairly reserve the channel resources together with the existing device. In addition, when a specific device returns the channel resource, the devices fairly use the returned channel resources without waste of the channel resources. When a predetermined amount of channel resource is required to guarantee QoS of a specific device, the present invention can always satisfy the QoS of the specific device.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
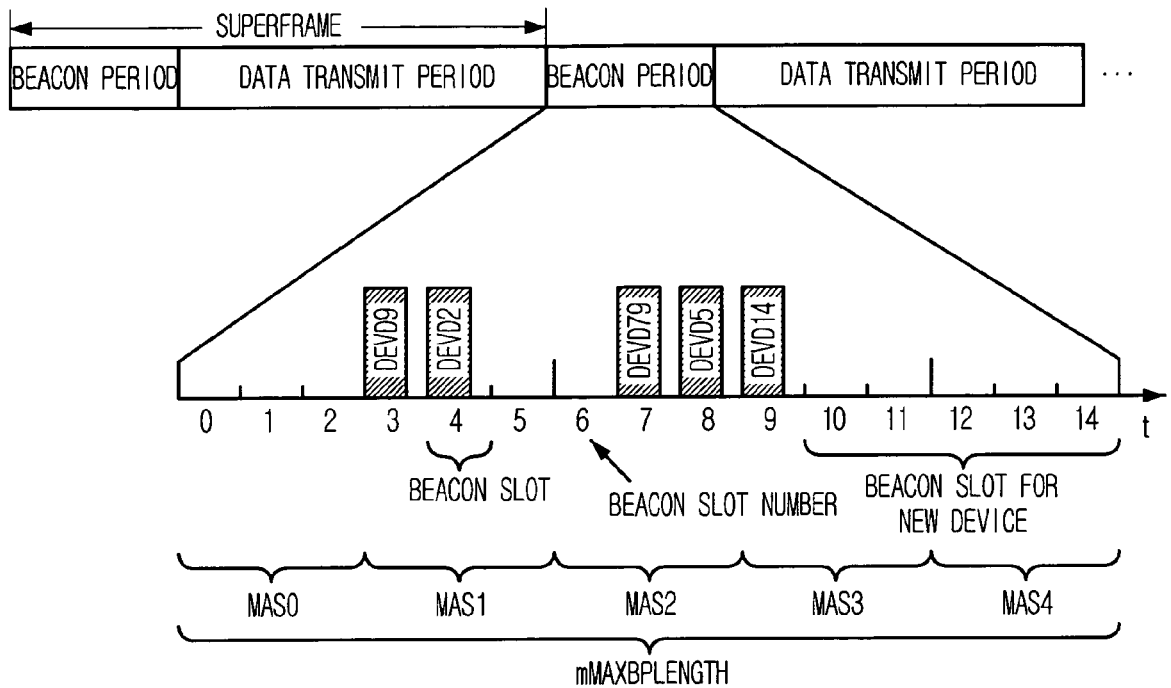
FIG. 1 is a diagram of a superframe used in a conventional MPA.
Figure 2:
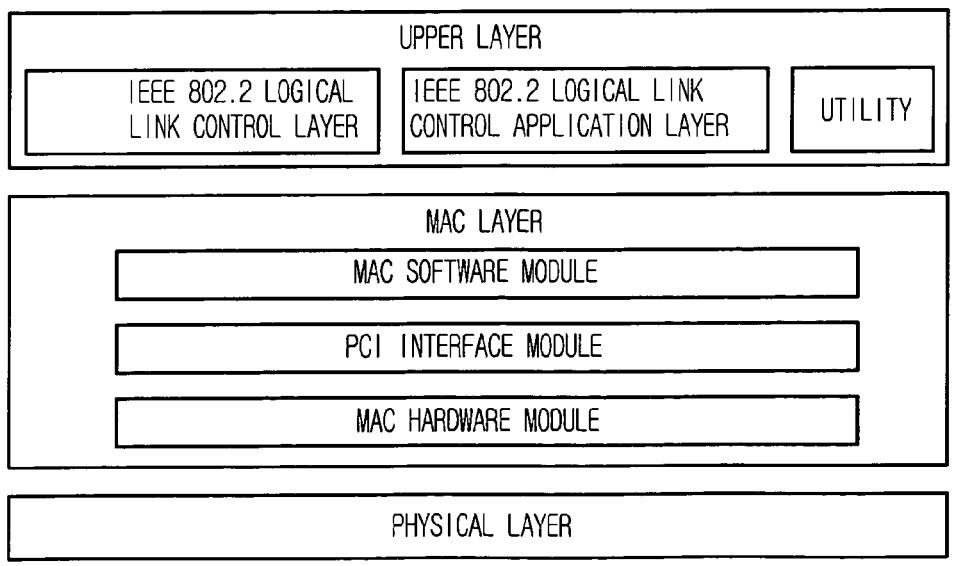
FIG. 2 is a block diagram of an MAC subsystem in accordance with an embodiment of the present invention.

FIG. 2 is a block diagram of an MAC subsystem in accordance with an embodiment of the present invention.

Referring to FIG. 2, the MAC subsystem includes an IEEE 802.2 protocol application layer, an IEEE 1394 protocol application layer, an upper layer, an MAC layer, an MAC software module, an MAC hardware module, and a PCI interface module. The IEEE 802.2 protocol application layer transmits data received from the application layer to the MAC layer, or transmits data received from the MAC layer to the upper layer. The upper layer is configured with utility. The MAC software module receives data from the upper layer and generates and stores MAC frame, or transmits MAC frame received from the physical layer to the upper layer. The MAC hardware module determines a transmission timing and transmits the MAC frame generated and stored by the MAC software module at an appropriate time, or transmits the MAC frame received from the physical layer to the MAC software module. The PCI interface module acts as the transmit/receive queue interface between the MAC software module and the MAC hardware module.

Meanwhile, in the method of using the channel resources in the MPA, the transmitter and the receiver reserve the channel resources using the DRP during the beacon period. However, there is no description of the criterion, detailed method or procedure for determining an amount of channel resources to be reserved. Hereinafter description will be made about the criterion and method when the devices reserve the channel resources.

Figure 3:
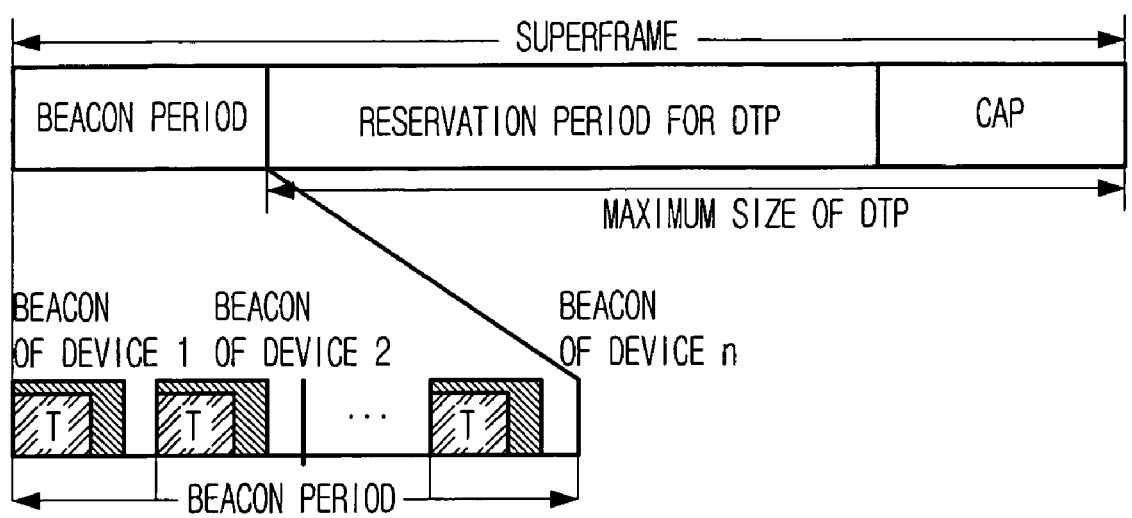
FIG. 3 is diagram of a superframe used in a channel resource assignment method in a mesh WPAN in accordance with an embodiment of the present invention.
Figure 8:
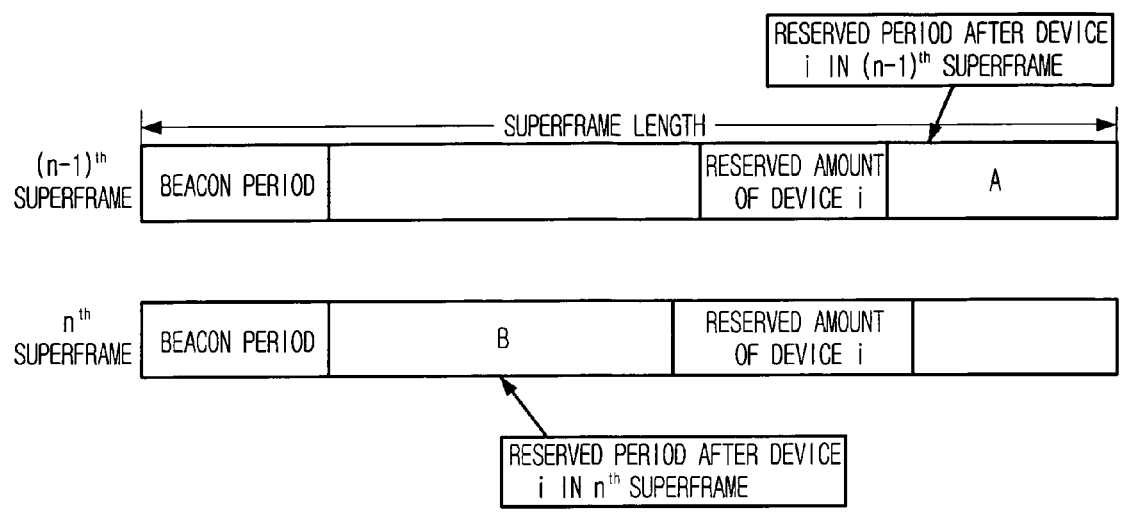
FIG. 8 is a diagram illustrating a channel resource reservation between superframes in a mesh WPAN in accordance with an embodiment of the present invention.

The respective devices transmit their own beacons during the beacon period. At this point, the devices calculate an amount of channel resources to be reserved and transmit it together. As illustrated in FIG. 3, the superframe in accordance with the present invention includes a beacon transmit period, a data transmit period (DTP), and a contention access period (CAP). The DTP is a period in which data is transmitted through reservation. The CAP is an inactive period in which a real transmission does not occur. Generally, the inactive period is added to the superframe in the actual system implementation. This addition does not cause great performance degradation. An amount of channel resource reserved by a device i is determined as follows. At this point, "C" is a maximum size of the DTP and is a sum of the DTP and the CAP. When the device i reserves the channel resource, a reserved amount of all devices except the device i is subtracted from "C" and then multiplied by a. The DTP reserved by the device and the inactive period are determined depending on the value of a. The DTP decreases as the value of a increases. The DTP increases as the value of a decreases. A value of $T_{others}$ is a sum of a reserved amount after the device i in a previous superframe and a reserved amount before the device i in a current superframe. That is, a sum of "A" and "B" in FIG. 8 is $T_{others}$ in an $n^{th}$ superframe. This is expressed as Eq. 1 below. The reserved amount of the channel resource of all devices except the device i is accumulated in its own register $T_{others}$. Eq. 2 below is an equation for calculating $T_i$, which is an amount of channel resource to be reserved by the device i. The amount of the channel resource to be reserved by the device i is determined by subtracting $T_{others}$ from The maximum size "C" of the DTP and multiplying the resulting value by a rate factor a.

$$T_{others} = \sum_{j \neq i} T_j \qquad \text{Eq. 1}$$

$$T_i = \alpha(C - T_{others}) \qquad \text{Eq. 2}$$

A channel resource assignment method in the mesh WPAN in accordance with an embodiment of the present invention will be described below in detail.

Figure 4:
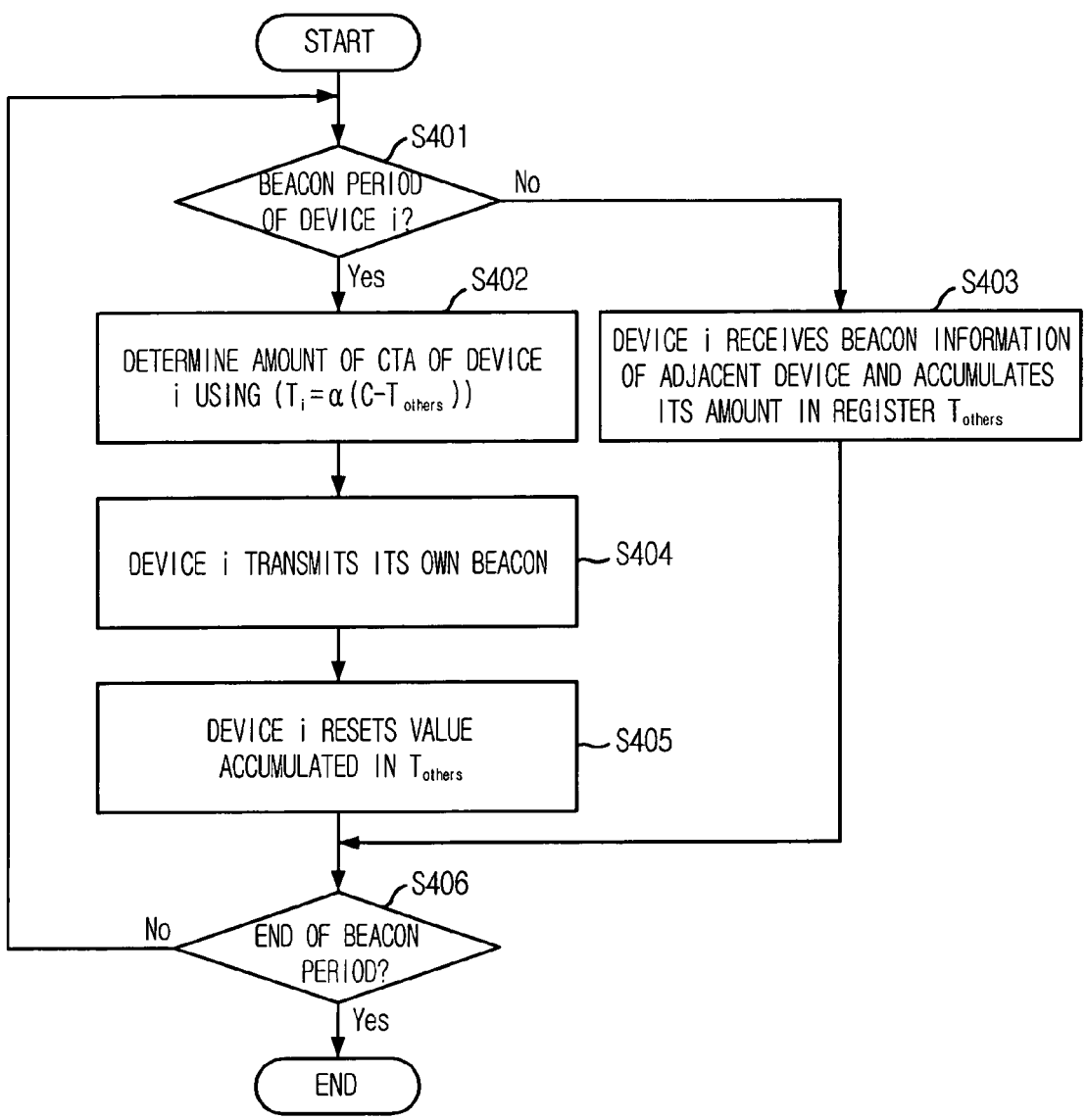
FIG. 4 is a flowchart illustrating a channel resource assignment method for fair channel resource reservation in a mesh WPAN in accordance with an embodiment of the present invention.

FIG. 4 is a flowchart illustrating a channel resource assignment method for fair channel resource reservation in a mesh WPAN in accordance with an embodiment of the present invention. Specifically, a process of determining an amount ($T_i$) of channel resource to be reserved by the device i is illustrated in FIG. 4.

The process of FIG. 4 is performed during the beacon period. That is, the process is performed at the time point when a new frame ends and the beacon period starts.

Referring to FIG. 4, in step S401, the device i determines whether a current beacon slot is a beacon slot to be used by the device i itself.

In step S403, when the beacon slot is a beacon slot for transmitting beacon of other device, an amount of channel resource reserved by other devices is checked and its accumulated amount is stored in the register $T_{others}$ like Eq. 1. Then, the process returns to step S401. In this manner, while an amount of channel resources reserved by the adjacent devices is accumulated, the beacon slot moves from a state 401 to a state 402.

In step S402, an amount of channel resources to be reserved by the device i is calculated using Eq. 2. That is, an amount of CAT to be used by the device i is determined. In step S404, the device i generates a beacon frame. As illustrated in FIG. 3, the channel of the device i is inserted into the beacon frame and notified to the adjacent devices. In step S405, after transmitting the beacon frame, the device resets the value accumulated in the register $T_{others}$ to zero. In step S406, it is determined whether the beacon period of the current superframe is ended.

When the beacon slot of the current superframe is not ended, the process returns to step S401. On the other hand, when the beacon slot of the current superframe is ended, the process is finished. The amount of the channel resource accumulated in the register $T_{others}$ is maintained and a next superframe is started. The value of the register $T_{others}$ is reset only in the state 405.

Figure 5:
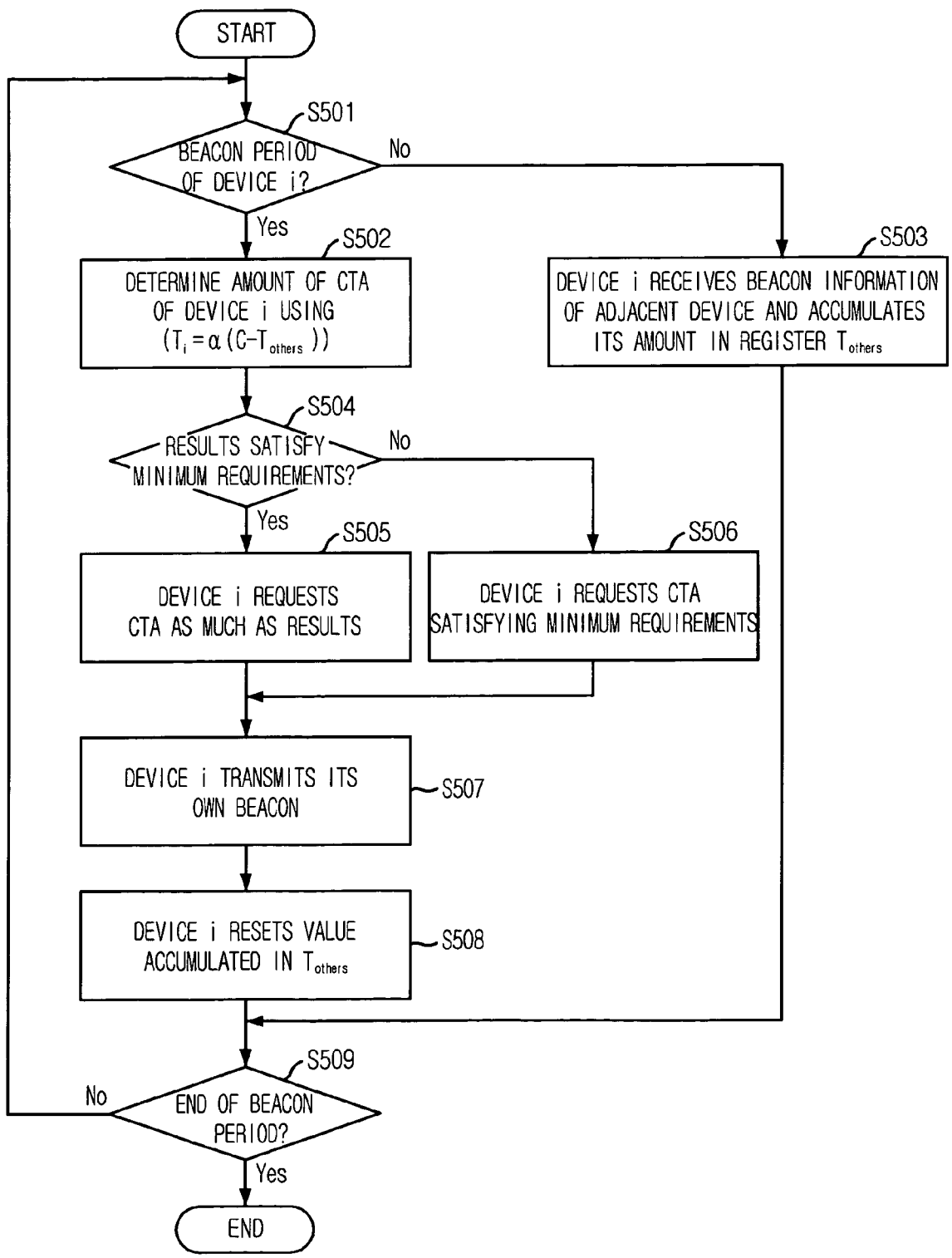
FIG. 5 is a flowchart illustrating a channel resource assignment method for guaranteeing QoS in a mesh WPAN in accordance with an embodiment of the present invention.

FIG. 5 is a flowchart illustrating a channel resource assignment method for guaranteeing QoS in a mesh WPAN in accordance with an embodiment of the present invention. The processes until the process of determining $T_i$ are the same as those of FIG. 4.

Referring to FIG. 5, in step S501, the device i determines whether a current beacon slot is a beacon slot of the device i itself. In step S503, when the beacon slot is not the beacon slot of the device i, the process proceeds to step S503. In step S503, an amount accumulated in the register $T_{others}$ is calculated and if the beacon slot becomes the beacon slot of the device i, the process proceeds to step S502. Like in FIG. 4, an amount of channel resources to be used by the device i is calculated using Eq. 2.

In step S504, the result value of Eq. 2 is compared with a minimum required amount.

The minimum required amount is a minimum amount of channel resource required for satisfying QoS of the device i. For example, if a channel time of at least 2000 μs is required in the superframe for video streaming service, a minimum required amount of channel resource is 2000 μs.

In step S505, when the result of Eq. 2 satisfies the minimum required amount in step S504, the channel resource is reserved as much as the result of Eq. 2.

In step S506, when the result of Eq. 2 is less than the minimum required amount, the channel resource is reserved as much as the minimum required amount, not the result of Eq. 2. In this case, the device i can always reserve the channel resource of more than the minimum required amount and always guarantee QoS of its own services.

When the amount of channel resource to be reserved is finally determined in steps S505 and S506, the process proceeds to step S507. In step S507, the device i generates and transmits its own beacon frame.

In step S508, a value accumulated in the register $T_{others}$ is reset and the beacon slot of the device i is ended. In step S509, it is determined whether the beacon period of the current superframe is ended.

When the beacon period of the current superframe is not ended, the process returns to step S501 and a next beacon slot is processed. On the other hand, when the beacon period of the current superframe is ended, the system is terminated.

Figure 7:
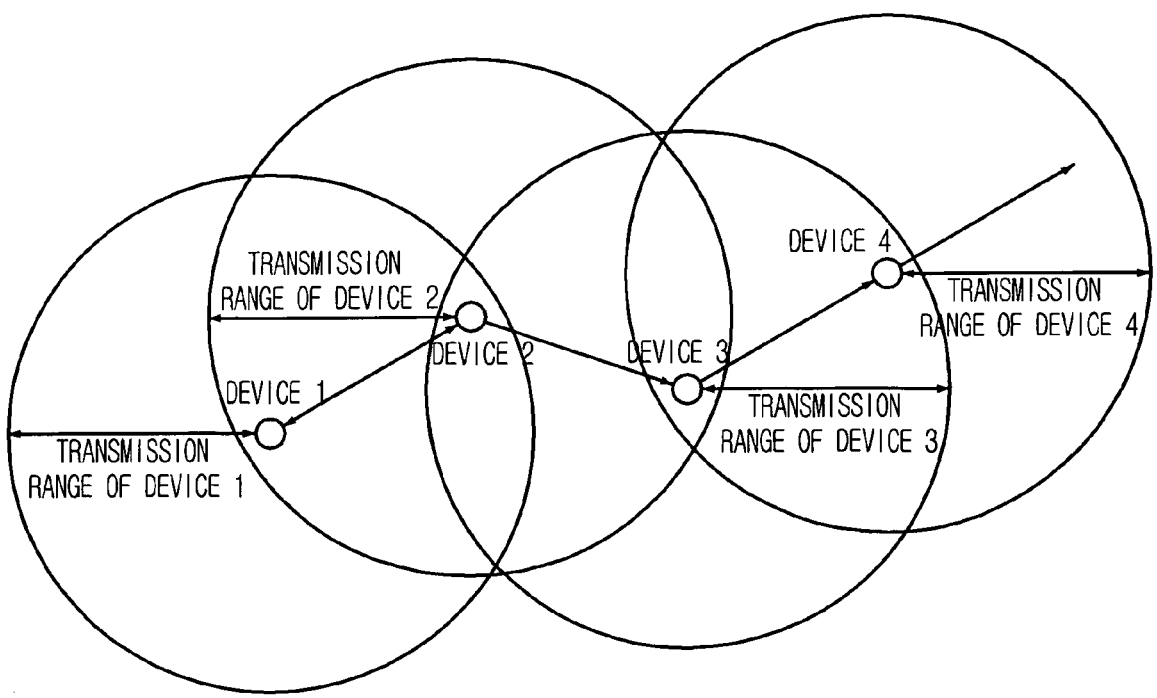
FIG. 7 is a diagram illustrating a channel resource assignment in which devices constructs a mesh network in a mesh WPAN in accordance with an embodiment of the present invention.

As described above, the present invention provides the channel resource managing method for channel resource assignment and QoS of the respective devices when the IEEE 802.15.3 WPAN is configured in the mesh type as illustrated in FIG. 7. In the mesh WPAN that assigns the channel resources to all devices without using the coordinator, the device receives the beacon information of the adjacent device and calculates the channel resources to be used by the device itself. When assigning the channel resources, the respective devices calculate an amount of channel resources using the equation. Therefore, the channel resources can be fairly assigned to all the devices. Also, the size of the DTP period and the size of the CAP period can be adjusted using the change of the value a.

In the case of the device to which QoS has to be guaranteed, the channel resources can be distributed through the setting of the minimum required amount, while satisfying the minimum required amount.

Figure 6:
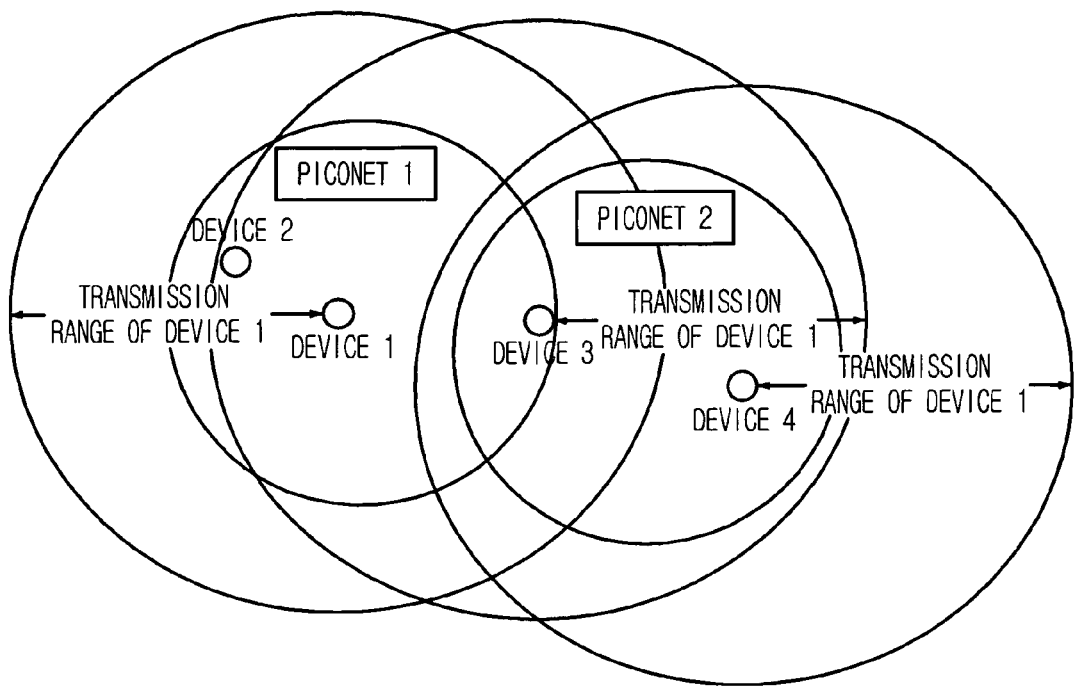
FIG. 6 is a diagram illustrating a channel resource assignment in which two piconets are placed in the same space in a mesh WPAN in accordance with an embodiment of the present invention.

In addition, the present invention can also be applied to the channel resource management when two piconets exist in the same space as illustrated in FIG. 6. In this case, a range where the beacon can be received and analyzed is defined as a piconet. In FIG. 6, the devices 1, 2 and 3 identify different beacons within the same beacon period. The device 4 can receive the beacon of the device 3, but cannot receive the beacons of the devices 1 and 2. In this manner, the piconet can be logically configured according to the reception of the beacon. In this environment, two piconets can fairly use the channel resources. In the mesh network of FIG. 7, the devices 1 to 4 are connected by 1 hop. In this case, all devices can fairly use the channel resources.

As described above, the devices can always use the channel resources efficiently in the mesh WPAN in which scattered devices are frequently connected and disconnected.

That is, the devices can fairly use the channel resources together with the adjacent devices in the mesh WPAN. Also, QoS can be always guaranteed by reserving the channel resources of more than the minimum required amount.

The above-described methods in accordance with the present invention can be stored in computer-readable recording media. The computer-readable recording media may include CDROM, RAM, ROM, floppy disk, hard disk, optical magnetic disk, and so on. Since these procedures can be easily carried out by those skilled in the art, a detailed description thereof will be omitted.

The present application contains subject matter related to Korean patent application No. 2005-121143, filed with the Korean Intellectual Property Office on Dec. 9, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A channel resource assignment method in a mesh Wireless Personal Area Network (WPAN), comprising the steps of:
   (a) transmitting beacons of all devices and adding an amount of channel resource to be reserved to the beacons so as to assign the channel resource for fair channel resource reservation between corresponding devices and adjacent devices when a mesh network is configured;
   (b) accumulating the amount of the channel resources reserved by all the adjacent devices except the corresponding device; and
   (c) determining the amount of the channel resources to be reserved by the corresponding devices using Eqs. 1 and 2

$$T_{others} = \sum_{j \neq i} T_j \qquad \text{Eq. 1}$$

$$T_i = \alpha(C - T_{others}) \qquad \text{Eq. 2}$$

where C represents a maximum size of a data transmit period (DTP) and is a sum of the DTP for reservation and a contention access period (CAP), and a is a rate factor, and wherein $T_{others}$ is a sum of a first reserved amount after the determined amount of the channel resources to be reserved by the corresponding device in a previous superframe and a second reserved amount before the determined amount of the channel resources to be reserved by the corresponding device in a current superframe.

2. The channel resource assignment method as recited in claim 1, further comprising the steps of:

(d) comparing the resulting value of Eq. 2 with a minimum required amount so as to distribute the channel resources while satisfying the minimum required amount necessary to guarantee quality of service (QoS); and (e) when the minimum required amount is satisfied, reserving the channel resources as much as the resulting value.

3. The channel resource assignment method as recited in claim 2, wherein when the minimum required amount is not satisfied, the channel resources are reserved as much as the minimum required amount.

4. The channel resource assignment method as recited in claim 2, wherein the minimum required amount is designated and the device always satisfies the minimum required amount.

5. The channel resource assignment method as recited in claim 1, wherein a sum of the channel resources used by specific devices and a length of an inactive period are adjusted through change of the value of a in Eq. 2.

* * * * *